United States Patent
von Stein et al.

(10) Patent No.: US 6,529,243 B1
(45) Date of Patent: Mar. 4, 2003

(54) METHOD FOR ELECTRONIC REDUCTION OF THE CONTRAST OF VIDEO IMAGES AS EARLY AS DURING RECORDING

(76) Inventors: Werner Ritter von Stein, Mispelweg 20, 22179 Hamburg (DE); Wolfgang Zahn, Landfriedstrasse, 81547 Munchen (DE)

(*) Notice: Subject to any disclaimer, the term of this patent is extended or adjusted under 35 U.S.C. 154(b) by 0 days.

(21) Appl. No.: 09/048,926

(22) Filed: Mar. 26, 1998

(51) Int. Cl.⁷ .............................................. H04N 5/225
(52) U.S. Cl. ...................................... 348/340; 348/344
(58) Field of Search ................................ 348/207, 209, 348/210, 218, 222, 234, 239, 335, 340, 342, 343, 344, 350; H04N 5/225

(56) References Cited

U.S. PATENT DOCUMENTS 4,591,918 A * 5/1986 Hisano ........................ 348/343
5,534,924 A * 7/1996 Florant ........................ 348/364
5,969,754 A * 10/1999 Zeman ........................ 348/136

* cited by examiner

Primary Examiner—Tuan Ho
(74) Attorney, Agent, or Firm—Michael A. Glenn; Kirk D. Wong

(57) ABSTRACT

A method for electronic reduction of the contrast of video images as early as during recording provides electronic brightening of the shaded zones of a video image in a camera as early as during recording while maintaining the detail contrast even in the brightened regions. A blurred diffuse image of the motif is produced on the image sensor in the camera by the objective and the electronically alterable diffusion element, and is stored in a frame store. The black and white contrast of the mask is determined in the evaluation circuit, and a control variable is generated pixel-by-pixel from this. The focused video image which is subsequently produced on the image sensor when the diffusion element is switch to be crystal-clear is read and is amplified or attenuated pixel-by-pixel such that the shadowed parts are brightened and/or the bright zones are attenuated.

22 Claims, 3 Drawing Sheets

METHOD FOR ELECTRONIC REDUCTION OF THE CONTRAST OF VIDEO IMAGES AS EARLY AS DURING RECORDING

SUMMARY OF THE INVENTION

Unless complex scene illumination is used, video images frequently suffer from unrealistic reproduction of high-contrast motifs. Even the use of special reproduction characteristics (knee circuit) on the camera side corrects the described defect only to an insignificant extent. According to the invention, it is intended to solve the problem by electronic brightening of the shaded zones of the video image in the camera as early as during recording. At the same time, it is important to maintain the detail contrast even in the brightened regions.

A blurred diffuse image (mask) of the motif is produced on the image sensor in the camera by the objective and the electronically alterable diffusion element, and is stored in a frame store. This blurred image represents the rough distribution of brightness and darkness in the motif. The black and white contrast of the mask is determined in the evaluation circuit, and a control variable is generated pixel-by-pixel from this. The focused (color) video image which is subsequently produced on the image sensor when the diffusion element is switched to be crystal-clear is read and is amplified (or attenuated) pixel-by-pixel via the amplifier, which is controlled by the evaluation unit, such that the shadowed parts are brightened and/or the bright zones are attenuated.

The invention applies to the production of still video, movie video as well as in television cameras.

DESCRIPTION

The invention relates to a method for electronic correction of the large-area contrast in video images as early as during recording.—As in the case of most picture reproduction methods, there is also a difficulty in screen reproduction of imaging objects with high-contrast light and shaded parts with a balanced brightness distribution, that is to say reproducing light areas and shadowed areas in a gradation as normally perceived. In addition, particularly with respect to the viewing of a screen, screens are normally used in reduced ambient lighting, which additionally makes it harder to reproduce shadowed parts such that they are transparent and have good detail. To avoid these weaknesses, it is necessary to aim for exactly matched scene illumination when making video recordings. This applies not only to studio work; even in the case of many professional recordings in the open air, it is necessary to work, when possible, with spotlights and fillers, which requires the use of a large number of personnel and is thus costly. However, on the other hand, artificial lighting is impracticable not only for many live reports, but also for amateur video recordings in the open air. Unnaturally high large-area contrasts are frequently created during video replay, as a consequence.

The aim of the invention proposed here is thus to describe a method using which the problems described above can be reduced. The physical principles of this method will be explained first of all.

Although efforts are being made to implement an image sensor characteristic which is curved in an S shape like a film (knee circuit) in a television camera, in order to make it possible to reproduce the most varied motif contrasts to a certain extent in a balanced manner with its aid, this method provides not only [sic] satisfactory results as well. The shadowed parts, which act in an unnaturally dark manner, and/or excessively bright light areas still occur in high-contrast motifs. The flat branches of the image sensor characteristics in the light and dark regions also lead to undifferentiated, low-contrast reproduction of details in these brightness regions.

To avoid this defect, it is proposed to introduce in video technology as well a method which is based on similar principles to those used in photography. There, when copying very high-contrast negatives, it is possible to brighten dark shadowed parts by means of the so-called dodging technique, without any loss in detail contrast occurring in so doing. This is done by the darkroom technician producing weaker exposure of the shadowed zones, by means of defined blurring, during the exposure of the photographic paper by moving his finger over the photographic paper in a local movement in the form of a fan, the shadowed zones in this way being brightened in the copy. This technique is, of course, dependent on correspondingly long exposure and large-format enlargement. It is obvious that considerable experience is required to carry out this technique, in order to avoid undesirable artifacts in so doing. The detail contrast (as well as the color contrast) are in this case maintained both within the shadowed zone to be brightened and in all the rest of the image, which guarantees the brilliant reproduction of all the image parts which is so important for an acceptable image impression. Photographically, this situation can be explained by the fact that the photographic paper is effectively given 2 different gradations as a result of the masking method: a steeper gradation (namely the original gradation) for reproduction of higher spatial frequencies (=detailed structures) and brilliant colors, and a flatter gradation for the lower spatial frequencies, that is to say the large-area structures, such as the lighted and shadowed regions for example. An even more general solution of this situation can now be achieved by producing in each case one individual blurred black-white mask for a plurality of spatial frequencies that are important to the motif, using computer means. In this way, it is possible to produce an effectively increasingly flatter transmission characteristic for increasingly coarser structures in the motif, although said transmission characteristic does not adversely affect the luminosity of the colors. This allows the natural charm of the pictures to be further improved. The "multilayer mask" to be formed for this purpose is one of the subjects of the invention in the present patent application (see method B, page 10 in this context).

This dodging method must in general not be equated to the alternatively conceivable use of a photographic paper having a flatter gradation. The large-area contrast could admittedly likewise be reduced by using such a paper, but the brilliance of the picture in terms of color and contrast would, however, in this way be flattened, and the image quality would in consequence be made considerably poorer.

According to the invention, it is now intended to use the masking method outlined above to improve the video images, to be precise during recording in the video camera. The methods presented in the following text are all based on the fundamental principle that a blurred black and white image of the recorded motif (=original imprint) is produced, and correction values are derived from this "mask" which can be used to correct the focused video image, in such a way that the large-area contrast of light and shadowed parts of the image is reduced. A major aim in this case is that the correction take place at the same time as the recording, and fully automatically.

Figure 1:
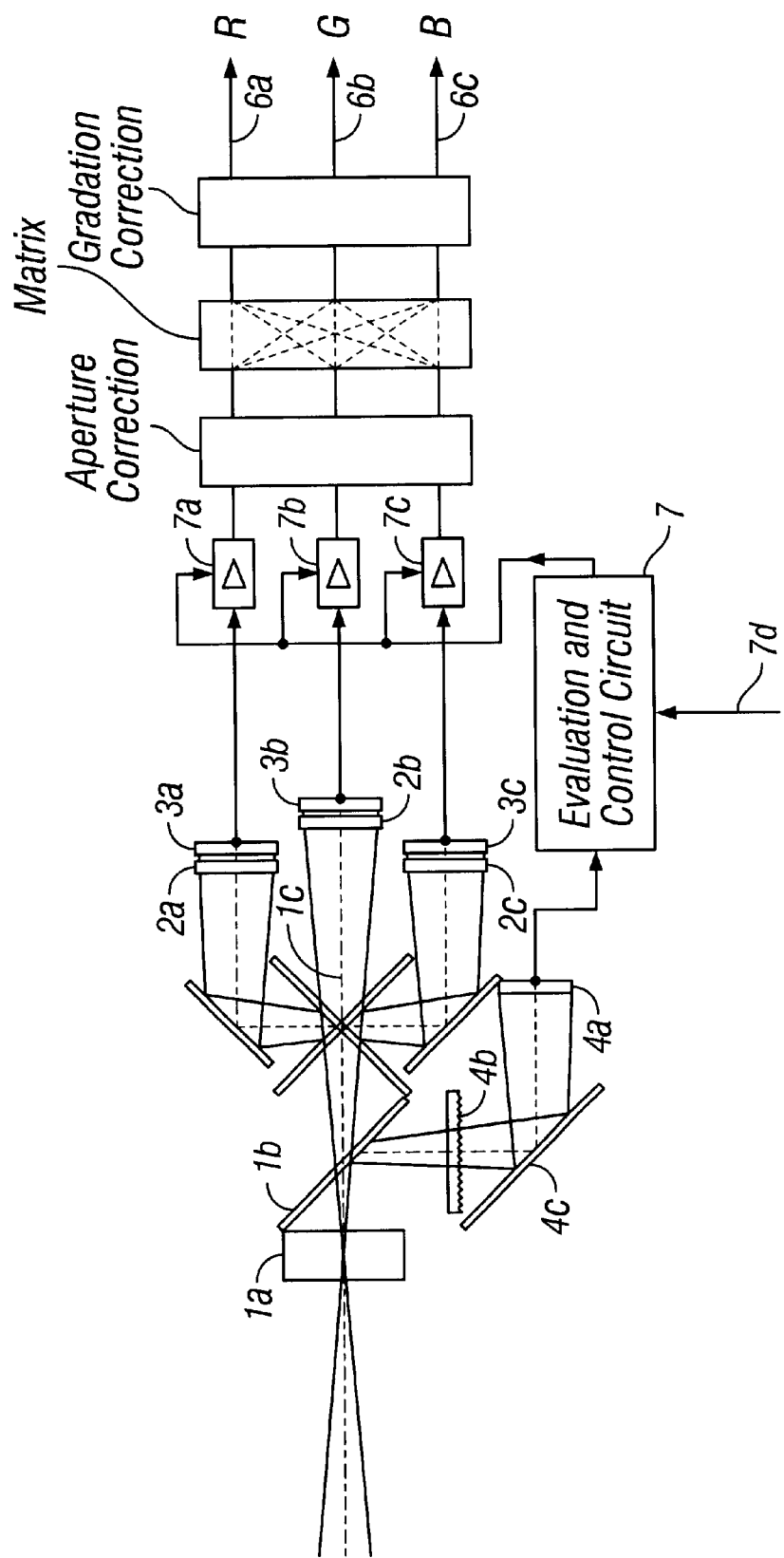
FIG. 1 is a block schematic diagram of the functional elements of a television camera using a preferred embodiment of the invention according to the invention.

The prior art in the field of influencing contrast described here is represented as follows:

Digital image processing methods have already existed for years, which also allow, inter alia, brightening of shadowed parts of images to be processed along the way via an operator-supported, that is to say interactive, dialog and monitoring system (by observing the screen).

It is furthermore known that patent applications have also appeared in recent years which describe how the improvement of photographic paper images which can be achieved by manual dodging can also be achieved in the course of present-day bulk copying technology by electronically controlled attenuation of the copying light in regions.

Furthermore, devices have already been disclosed for photographic amateur copying which, based on color negative films, store the electrooptically obtained and digitized video signals of these originals in frame stores, improve these video signals by computer techniques, and control point-by-point exposure of photographic paper by means of these processed video data.

A specific feature of the above prior art is that all the data for the originals to be processed are already available at the starting point of the methods, that a comparatively long time is available for processing these data, and that it is necessary or at least worthwhile to monitor the correction results on a screen.

A rapid and fully automatic method based on the technical principles described initially is described in the present invention, which method is able, during the production of video films or images, to brighten shadowed zones—corresponding to the natural visual impression—without the detail contrast being reduced in the process. The video signals from the individual image sensors for red, green and blue (3-chip camera) and the signals from a color image sensor (1-chip camera) are intended to be corrected appropriately in the video camera, for this purpose.

The object is achieved according to the invention by two alternative methods (A and B) using different techniques. The characterizing features of the two methods are presented in the method claims 1, 2 and 3, and claims 4 and 5 as well as 6. These devices are explained, and their methods of operation described, in the following text, with reference to the figures.

METHOD A

The Production of the Blurred Image by a Blurred Image of the Object on an Image Sensor If it is desired to correct the video signals even at the time at which they are recorded, for example in a television camera (or in the downstream devices) during a live transmission, the problem exists that the said correction must be carried out before all the image has been scanned on the image sensors in the video camera, that is to say before all the information relating to the light/dark structure of the image currently being recorded is available at all. It is intended to overcome this difficulty by the method described in the following text. A specific feature in this case is the way in which the blurred black and white mask of the original image is produced.

The essential functional elements of a television camera are illustrated schematically in FIG. 1. The incident light passes through the objective 1a to the beam splitter mirror 1a, which splits the light roughly into its spectral components of red, green and blue. The motif is imaged in focused form, partially via fully reflective mirrors and by specially adapted color filters for red (2a), green (2b) and blue (2c), on the image sensors 3a, 3b and 3c located behind said items. The image sensors are read in parallel, in a known manner, pixel-by-pixel and line-by-line. The video signal s for the colors red, green and blue are output individually and are amplified or attenuated in synchronism and in parallel, via the controllable amplifiers 7a, 7b and 7c. In this way, corrected video signals are obtained which are further processed in a known manner and are present at the output of the video camera as RGB signals 6a, 6b, 6c.

According to the invention, it is now intended to image the object to be recorded on a further, monochrome image sensor 4a—but now blurred. All the motif details are suppressed in this blurred image, which therefore represents a rough distribution, to scale, of lightness and darkness in the object.

In order to produce the blurred image, a small part of the light is reflected out, via the neutral partially reflective mirror 1b, between the objective 1a and the beam splitter mirror 1c. A fully reflective mirror 4c deflects the light onto the sensor 4a, which is essentially identical to the image sensors 3a . . . c. The defocusing is produced by the diffusing element 4b. This can be assisted by slightly defocusing the image.

The blurred, neutral-color brightness signal from the sensor 4a is supplied to the electronic evaluation circuit 7, which in turn calculates the control signal for the amplifier elements 7a . . . c and outputs it to these elements. In the functional layout used here, the amplifiers 7a . . . c amplify or attenuate the image sensor signals red, green and blue as a function of the blurred signal, before they are passed to the further correction circuits.

Figure 2A:
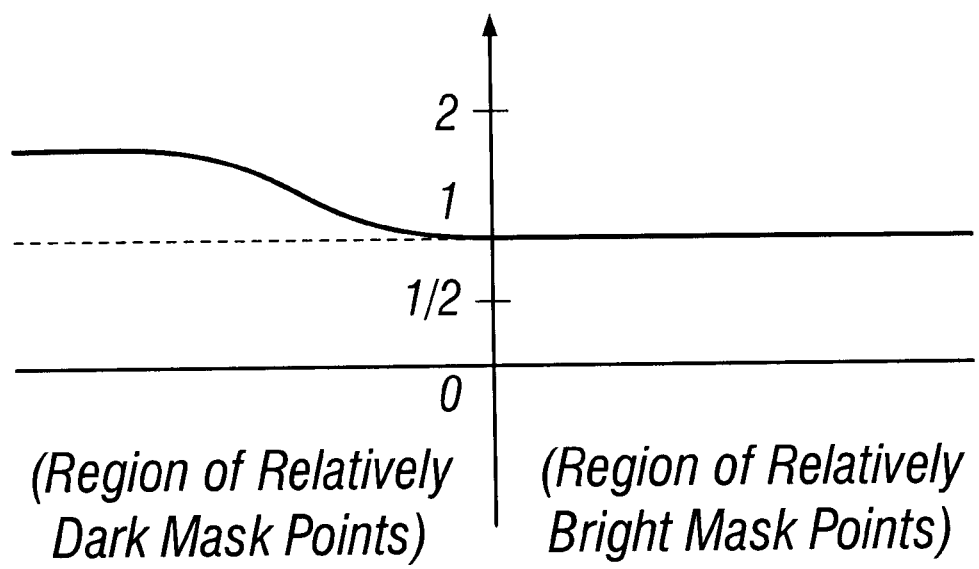
FIG. 2a is a diagram showing a basic curve for the procession of pixel signals of a blurred channel by the invention's evaluation circuit according to the invention.
Figure 2B:
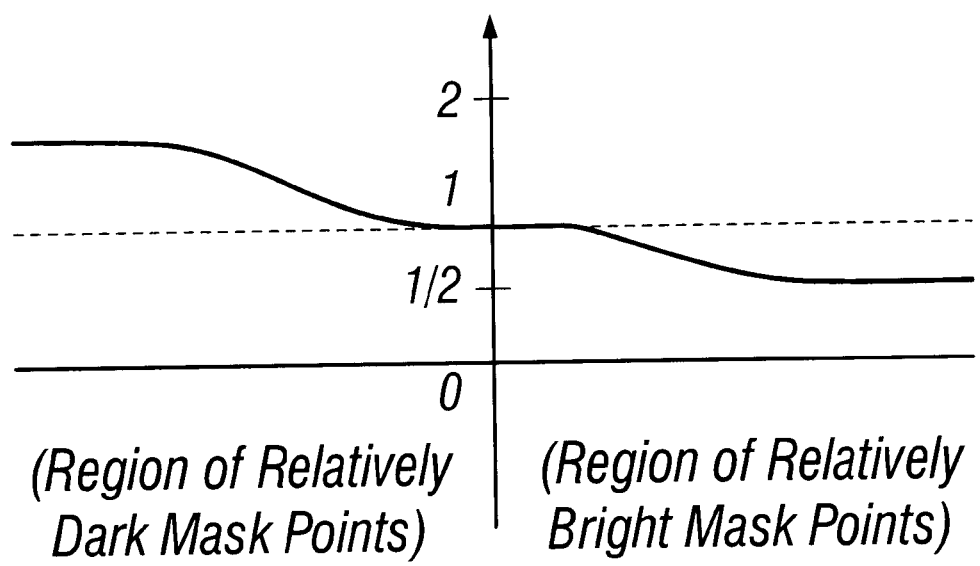
FIG. 2b is a diagram showing a basic curve for the processing of pixel signals of a blurred channel by the invention's evaluation circuit according to the invention.

FIG. 2 shows basic curves (curves 7e and 7f) for the processing of the pixel signals of the blurred channel in the evaluation circuit 7. The essential feature for the method of operation of the evaluation circuit 7 is that the derived correction signals are independent of the overall brightness of the image which is produced on the image sensor 4a. This is achieved in that the correction signals are dependent only on the brightness ratio, for example, of the shadowed parts to the mean value of the blurred video signals (or on another value which represents the average brightness of the mask). The Signal Sequence is as Follows:

Via the objective 1a, the object is imaged in focused form on the 3 image sensors 3a . . . c, and in a blurred manner on the image sensor 4a, superimposed, and the associated 4 video signals are read at the same time. The video signals are fed from the sensor 4a to the evaluation circuit 7. The video signals from the respectively preceding image scan, which—because it is blurred—is virtually identical to the current image scan, have already been integrated in this circuit. The signal mean value resulting from this has subsequently been stored in logarithmic form. The present, current blurred video signal likewise has its logarithm taken in the circuit, and the logarithm of the stored mean value is subtracted from it. This difference signal is a measure of the brightness discrepancy between a pixel in the "blurred" image and the mean brightness of this image. The gain corrections for the "sharp" RGB video signals are now defined in the evaluation and control circuit 7, which also contains the controlled amplifiers 7a . . . c, in accordance with the characteristics in FIG. 2, and said "sharp" RGB video signals are amplified or else attenuated via the amplifiers—depending on the profile of the characteristic.

The correction scheme resulting from the curve 7e, FIG. 2 now leads to the following image correction: for points which are of equal brightness to, or brighter than, the mean value of the "blurred" signal from the sensor 4a, the difference of the brightness logarithms leads to 0 or a positive value. This should result in a constant gain of unity, that is to say the "sharp" RGB signals are passed on unchanged. For the darker points in the "blurred" image, that is to say the shadowed regions, the difference is less than 0, and the gain factor resulting from this is preferably between 1 and 2, corresponding to the characteristic. This means that, the darker the shadowed regions on the sensor 4a are in comparison with the mean value, the greater the gain factor becomes. The "sharp" video signals of these image regions, which come from the sensors 3a . . . c, are thus increasingly amplified, brighter reproduction, with constant detail contrast, being achieved in these regions by the multiplicative lifting of the video signal.

Other control curves, for example corresponding to FIG. 2, curve 7f, may also optionally be used. In this case, the shadowed video signals are amplified as in the case of curve 2a, those points which are at the mean brightness level remain the same, but the brighter image parts are attenuated, that is to say set to be darker. Attenuation, in a further example, of only the normal and relatively bright image parts at the same time as opening the iris aperture would lead to the same aim.

Finally, it is also intended to explain the interaction of the contrast suppression proposed here, for example using the automatic objective aperture of the camera. Substantially more balanced brightness reproduction is also achieved in this case. This will be explained using the following example: if one considers, for example, a video camera being panned from a dark piece of woodland to an adjacent bright sky, then the automatic stopping down of the automatic aperture during the panning will result in the piece of woodland being increasingly darkened and the piece of sky becoming much too bright as it becomes larger. The brightness reproduction will not become, to a certain extent, natural again until the sky finally occupies the majority of the image. The contrast compensation method described here would now result in the woodland being brightened but the sky being darkened, contrary to the woodland becoming increasingly darker as the aperture is stopped down, as long as both areas are in the image. In contrast, nothing changes with respect to the brightness of the original scene and the final scene (total woodland and total sky=little contrast). The contrast reduction thus also results in considerably softer transitions during camera panning.

As shown, the described correction method thus operates fully automatically, the higher the image contrast, the stronger is the brightness compensation; the lower the contrast, the more the correction tends to zero. However, under some circumstances, for example from an artistic viewpoint, it may be desirable to use even scenes with high contrast, uncorrected, from the start. In order to achieve this—apart from the option to change the setting on the camera during the recording (FIGS. 1, 7d, automatic correction off/on or strong/weak)—subsequent correction monitoring or reprocessing by an operator may be necessary.

For reprocessing, a) the signal data of the focused, corrected video images can be recorded at the same time as the uncorrected original video data from the original video images, for example, on magnetic tape, and the relevant image sequences whose contrast has been corrected can be replaced by the original uncorrected sequences, or vice versa, in a corresponding processing device, after visual inspection or b) the signal data from the original images can be stored on magnetic tape or the like at the same time as the pixel-related correction values obtained from the processed blurred video data, and the (uncorrected) original film can be corrected on a processing device only in those scene sequences with the correction values which require this correction as a result of visual monitoring. The strength of the correction can also be influenced retrospectively by the operator in this method.

Figure 3:
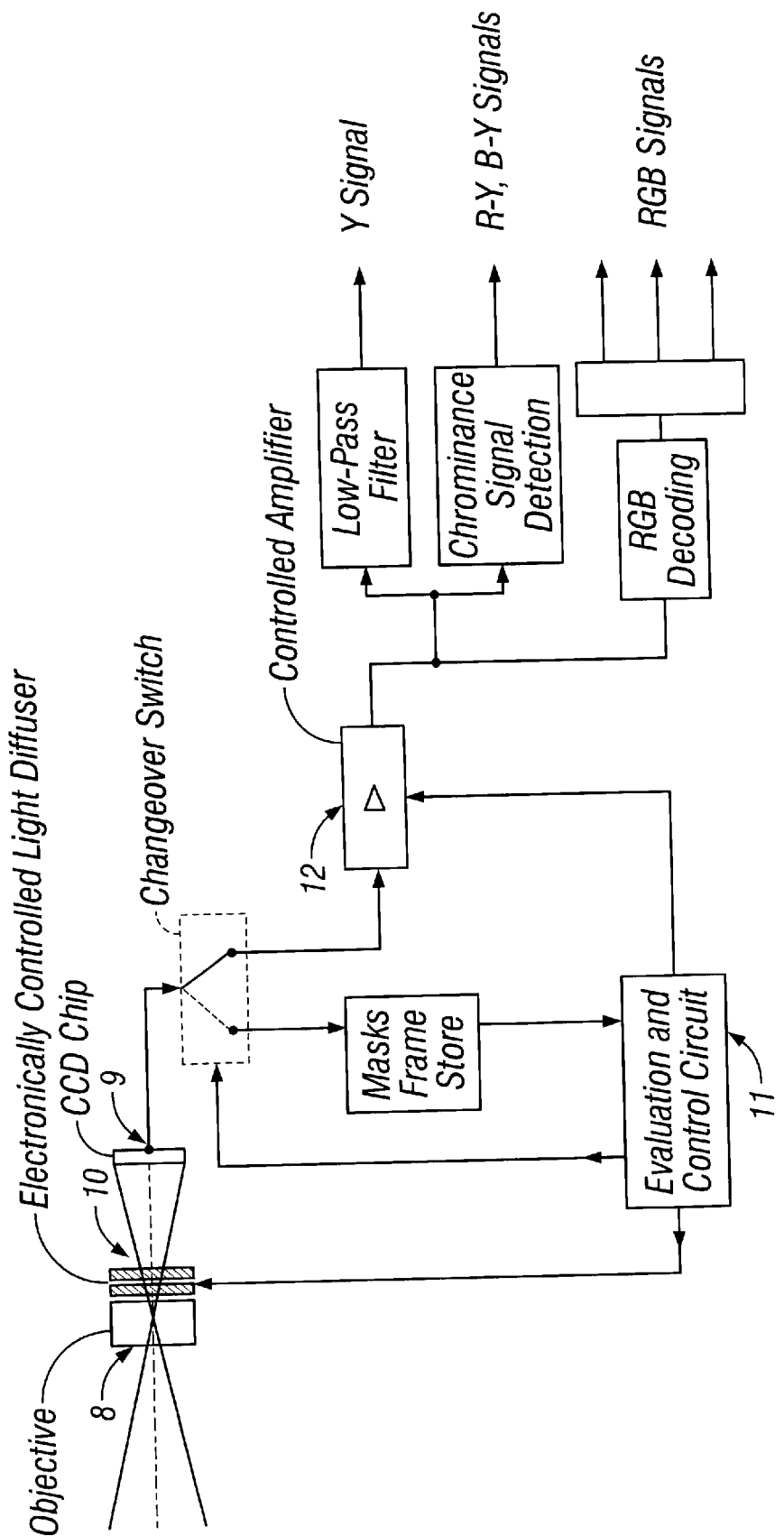
FIG. 3 is a block schematic diagram of the functional elements of a video camera with one image sensor using a preferred embodiment of the invention according to the invention.

The Following Technical Solutions May Be Used for Still Video Cameras with 1 Image Sensor In still video cameras (1-chip cameras), the blurred image is imaged on the (same) image sensor before the focused image in time, is read from there, and is buffer-stored. The focused image can then be corrected using the correction factors obtained from the stored blurred image (FIG. 3). The glass panel-plastic sandwich 10, into which nematic liquid crystals are embedded and which is fitted between the objective 8 and the image sensor 9, is suitable, for example, for generating a blurred image immediately before the exposure of the image sensor to the focused image. When an alternating electrical field is applied, these liquid crystals change to a crystal-clear transparent state, while they assume a light-diffusing consistency when the field strength is reduced. (NCAP technology: Nematic Curvilinear Aligned Phase). In this way, a blurred image and a focused image can be projected onto the image sensor 9 in a short sequence. The blurred image is read, buffer-stored, and its brightness (luminance) signal is evaluated in the evaluation and control circuit 11, in a similar way to that described in the preceding section. The evaluation and control circuit 11 then supplies the information by means of which the focused video signal is influenced, homologously with respect to the pixels, via the amplifier 12.—A diffusing medium, which is briefly swiveled in and out mechanically, may also be used as an alternative to the electronically controlled light diffusing device.

If the recording objective has only one fixed focal length (for example in the case of simple still video cameras), a dedicated imaging system, having a lens, the diffusing element and a further image sensor, may also be implemented in the camera in order to present the unfocused image.

METHOD B

Production of the Blurred Mask by Computer Processing of the Image Sensor Signals of the Original Image It is also becoming possible to implement the already described multiple masking (multilayer mask) as a result of the increasing performance of modern small computers. The following computer program is run in an electronic computer, for this purpose:

Pixel-by-pixel storage of the digitized video data of an image in the frame store of an electronic computer (original image)

Analysis of the spatial frequencies occurring in the image and of the associated contrasts of the brightness (luminance) signal On the basis of the spatial frequencies and associated contrasts determined, calculation of a plurality of masks having specific contrasts and having different resolution capabilities, by the use of specific defocusing algorithms (low-pass filter)

Correction of the stored original image data by linking it to the homologous-point data of the multiple mask (in the case of movie image sequences, the mask derived from image n can also be used to correct the focused image n+1 (or higher), because of the similarity of the masks of successive images.)

Transfer of the corrected video data for further processing on data media, a screen, transmitter or the like.

The complex calculation of the multilayer mask can also be carried out in simplified form. To this end, a unit multilayer mask type, which is derived from a multiplicity of motif examples and whose use is only matched to the individual motif and its large-area contrast, is defined with respect to the cut-off frequencies and the associated gradations.

The computer correction of the original images using method B can be carried out both in the video camera and in devices connected downstream of the camera, while recording, as well as during the processing of already existing magnetic recordings of video films. In the same way, for example, cine films on photographic recording material can likewise be processed in a scanning and correction device, which operates using the basic principle of method A, in the same way as in a correction device according to method B, in which the blurred mask is produced by computer means.

It is thus possible to correct a cine film fully automatically, that is to say without interactive operation, it being possible to preselect a moderate contrast correction response, depending on experience with the exposure quality of the films.

What is claimed is:

1. A method for processing an original video image, which is produced in a video camera from an object, by linking the original image's video signals to the video signals of an image whose scene is largely identical to the original image but which has been blurred, wherein the video signals of this blurred image are generated on an image sensor by means of a blurred projection of the object which is produced using optical means.

2. An apparatus as claimed in claim 1, wherein the production of the video signals of the blurred image is carried out in parallel with the production of the video signals of the original image in the video camera, via a dedicated image sensor.

3. The method as claimed in claim 1, wherein the production and reading of the blurred and of the focused video signals of the object are carried out sequentially via the same image sensor.

4. A method for processing an original video image, which is produced in a video camera from an object, by linking the original image's video signals to the video signals of an image whose scene is largely identical to the original image but which has been blurred, wherein two or more differently blurred image extracts are derived from the stored original image in order to generate this mask in an electronic computer, and are combined in a frame store to form a single combined mask, and this mask is used to correct the video signals of the stored original image.

5. The method as claimed in claim 4,
wherein the said differently blurred image extracts are calculated from the original image by using diffusing algorithms,
wherein said differently blurred image extracts differ specifically in the spatial frequency ranges resolved by said differently blurred image extracts, and
wherein the said differently blurred image extracts have individual contrast ranges.

6. The method as claimed in claim 1, wherein the effective local radiation sensitivity of the image sensor for the original image is varied in an analogous manner to the area-related intensity distribution of the video signals of the blurred video image.

7. The method as claimed in claim 1, wherein the video signals of the blurred video are used in such a manner that correction values are derived from the signals of the pixels in this blurred mask, by means of which correction values the homologous pixel signals of the associated original image are corrected.

8. The method as claimed in claim 6, wherein the resultant correction of the video signals of the original image is essentially carried out such that the video signals are amplified or attenuated as a function of the value of the electronically processed homologous brightness signals of the blurred image.

9. The method as claimed in claim 7, wherein the resultant correction of the video signals of the original image is essentially carried out such that the video signals are amplified or attenuated as a function of the value of the electronically processed homologous brightness signals of the blurred image.

10. The method as claimed in claim 7, wherein the correction of the original video signals reduces the difference between the integral brightness of the dark and light image regions of the focused image.

11. The method as claimed in claim 1, wherein the level of blurring of the said video images which have been blurred is preferably provided such that the limit magnitude of the details still resolved is of the order of magnitude of 2% to 20% of the linear extent of the frame format to be reproduced.

12. The apparatus as claimed in claim 1, wherein the imaging of the blurred image is carried out, via a beam splitter arrangement, by the standard objective.

13. The method as claimed in claim 1, wherein an image blurring device and/or a diffusing attachment or another diffusing optical media are/is used as the said optical means for blurring.

14. The method as claimed in claim 1, wherein the said optical means in the camera are variable or interchangeable, and various blurring levels can thus be selected.

15. The method as claimed in claim 13, wherein the said optical means in the camera are variable or interchangeable, and various blurring levels can thus be selected.

16. The method as claimed in claim 13, wherein the said diffusing optical media are composed of transparent base material having inclusions into which molecules are embedded which are oriented when an electrical field is applied and thus change from a state which scatters the light to an optically clear state or vice versa.

17. Method according to claim 1, wherein
the current blurred analog video signal of the image sensor to which the blurred image is applied, and/or the video signals of the blurred image which have been scanned one or more image sequences in advance, or intermediate values derived from them, are/is used to generate the correction values for correction of the video signals of the original image.

18. The method as claimed in claim 1, wherein both the uncorrected signal data and the corrected signal data of the image sequences, or parts of them, are stored in the video camera or downstream equipment, on magnetic tape or other recording media.

19. The method as claimed in claim 7, wherein both the original uncorrected video signal data and the correction values derived from the blurred video signals are stored in the video camera or downstream equipment, on magnetic tape and/or other storage media.

20. The method as claimed in claim 18, wherein after visual inspection and in a processing device, video films or individual images are supplemented by insertion of stored corrected scenes/images, or are corrected with the aid of the stored image correction data.

21. The method as claimed in claim 19, wherein after visual inspection and in a processing device, video films or individual images are supplemented by insertion of stored corrected scenes/images, or are corrected with the aid of the stored image correction data.

22. A method for processing cine films on transparent photographic recording material, wherein these films are processed on processing devices which are constructed and/or operate according to claim 1, and in which the transparent image original of the cine film represents the object from which an original video image is produced.

* * * * *